Sept. 25, 1945.  R. O. MONROE  2,385,421
ROTARY PRESSURE JOINT
Filed Aug. 7, 1943
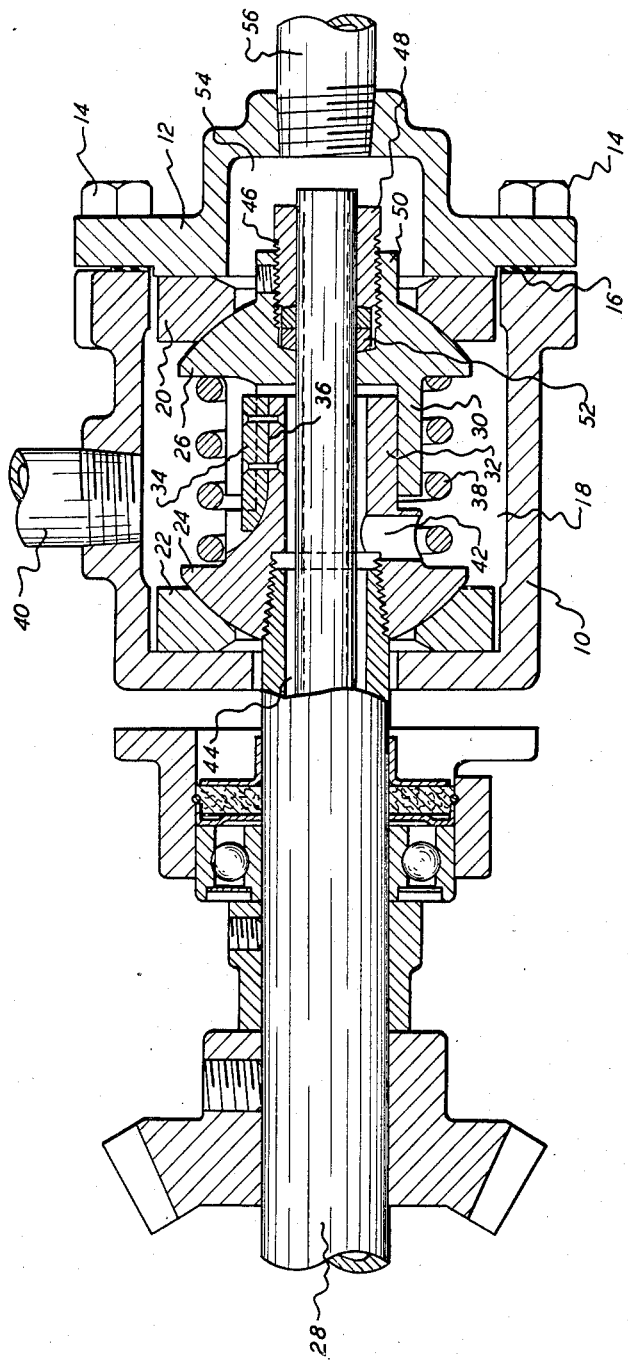
Inventor
ROLLO O. MONROE
By Beaman & Langjach
Attorney Patented Sept. 25, 1945

2,385,421

UNITED STATES PATENT OFFICE 2,385,421

ROTARY PRESSURE JOINT

Rollo O. Monroe, Three Rivers, Mich., assignor to The Johnson Corporation, Three Rivers, Mich., a corporation of Michigan Application August 7, 1943, Serial No. 497,724

2 Claims. (Cl. 285—10)

The present invention relates to improvements in rotary joints especially designed to be used in connection with the admission of steam and the exhausting of condensate from steam heated, rotated drums and cylinders. Joints of the type to which the present invention relates, if they are to remain in service for any length of time, must be so designed as to maintain alignment without stresses, strain or distortion. Moreover, it is necessary to take every possible precaution to avoid leakage of steam from the steam distribution side of the joint into the condensate return side. Should leakage occur this results in equalization of the pressures with a resulting failure in condensate disposal. As the maintenance of constant temperatures in the rotated heated drum cylinder is of extreme importance in many lines of manufacture, the proper design of the rotary joint so as to give leak proof operation over a long period of time is highly desirable.

According to the present invention a rotary joint is provided wherein improved means are employed for assuring alignment between the steam and condensate pipes free from stresses, strain and distortion.

Another object of the invention is to provide a rotary joint of the type described in which the design is such as to permit adjustment for wear while at the same time providing adequately against stress and distortion whereby leakage is prevented between the steam distribution side of the joint and the condensate return side.

These and other objects and advantages residing in the combination, construction and arrangement of the parts will be more fully appreciated from a consideration of the following specification and the annexed claims.

In the drawing a vertical cross-sectional view is shown in which one form of the invention is illustrated in connection with a rotary joint for a dryer reel. The nonrotating housing 10 has a head 12 with bolts 14 employed to draw the head down against the gasket 16 to prevent any leakage of steam from the chamber 18. Packing rings 20 and 22 have flat seats engaging with walls of the housing 10 and head 12, as well as spherical seats engaging with spherical thrust members 24 and 26.

As illustrated, the nipple 28 is threaded into the member 24. Spherical thrust members 24 and 26 have telescoping sleeve portions 30 and 32. A key 34 fixed to the sleeve 32 is in driving relation with a slot 36 in the sleeve 30. Through this arrangement the members 24 and 26 are driven as a unit through the nipple 28, with the key 34 permitting relative axial movement between the parts 22, 24, and 26 under the stress of the spring 38.

As will be readily understood, the spherical seats defined by the packing rings 20 and 22 support the spherically shaped members 24 and 26 with a ball and socket action which, with the telescoping relation of the sleeves 30 and 32, under stress of the spring 38 compensating for wear and holding the members 24 and 26 in sealing relation with the packing rings 20 and 22 prevent leakage of steam being admitted through the pipe 40 from the chamber 18.

Steam admitted into the chamber 18 passes through the port 42 to be conducted by the nipple 28 to the interior of the drying drum. Nested within the nipple 28 is the condensate pipe 44, which is supported from the member 26 and sealed by the packing box generally designated by reference character 46 consisting of a gland nut 48 threaded into the collar 50 of the spherical shaped shoulder or thrust 26. By screwing in the gland 48, the packing 50 is compressed into sealing relation with the outside of the pipe 44 to seal out any passage of steam from the chamber 18 or from within the nipple 28 from leaking into the chamber 54 into which the condensate is discharged as it passes to the outlet pipe 56.

By incorporating a packing box for the condensate pipe 24 into the thrust member 26 equalization of pressures in the chambers 18 and 54 due to leakage is obviated to a great extent. Packing box 46 also permits relative movement between the pipe 24 and the thrust member 26 which might occur as the result of expansion or adjustment for wear between the members 24 and 26 and the packing rings 20 and 22.

It should be apparent from the following described constructions that to a great extent possibilities of stresses, strain and distortion between the associated parts under actual operating conditions have been eliminated.

Having thus described my invention, what I desire to secure by Letters Patent and claim is:

1. In a rotary joint of the type described, the combination wth a fixed housing, means defining a universal joint supported within said housing and dividing the same into steam and return condensate chambers, and an outer conduit fixedly connected to said joint and having communication with said steam chamber, a condensate return conduit nested within said outer conduit, one portion of said universal joint having an axial bore in which said condensate conduit is slidably supported, a packing box constituted as an enlarged continuation of said first bore for sealing said condensation conduit in said joint portion, said condensation return conduit opening at one end into said condensation chamber.

2. In a rotary joint of the type described, the combination with a universal joint having two relatively movable spherical portions, sealing rings having complementary spherical seats in which said joint portions are supported for universal movement, and an outer steam pipe fixedly connected to one of said joint portions of a condensate return pipe nested within said steam pipe and having a sliding supporting connection with the other of said joint parts, and a packing box defined in said other of said joint parts and embracing said condensation return pipe to provide a sliding seal.

ROLLO O. MONROE.